Patented Sept. 20, 1932

1,878,700

UNITED STATES PATENT OFFICE

WINFRID HENTRICH, OF WIESDORF-ON-THE-RHINE, AND RUDOLF KNOCHE, OF LEVER-KUSEN-ON-THE-RHINE, GERMANY, ASSIGNORS TO GENERAL ANILINE WORKS, INC., OF NEW YORK, N. Y., A CORPORATION OF DELAWARE

MONOAZODYESTUFFS

No Drawing. Application filed March 19, 1929, Serial No. 348,355, and in Germany March 30, 1928.

The present invention relates to monoazodyestuffs, more particularly it relates to dyestuffs of the following general formula:

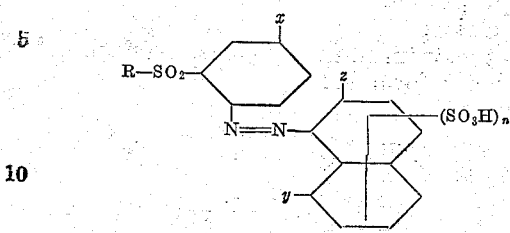

wherein R stands for a benzene nucleus, which may be substituted by an alkyl-, a sulfonic acid-, hydroxy- or substituted hydroxy-group, $x$ stands for a nitro group or an $NH_2$-group, $y$ stands for hydrogen or a hydroxy group, $z$ stands for an amino group, which may be substituted by alkyl- or aryl-groups, $n$ stands for one of the numbers one and two, and wherein the benzene and naphthalene nuclei may be further substituted.

Our new dyestuffs are obtainable by diazotizing an amine of the general formula:

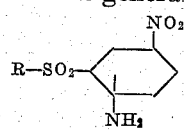

wherein R stands for a benzene nucleus and wherein R and the benzene nucleus may be substituted by an alkyl-, a sulfonic acid-, hydroxy- or substituted hydroxy group, and introducing the diazo-solution into an aqueous suspension which has been rendered acid to Congo of a coupling component of the general formula:

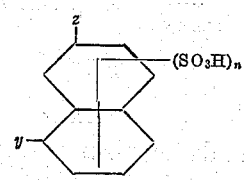

wherein $y$ stands for hydrogen or a hydroxy group, $z$ stands for an amino group which may be substituted by alkyl- or aryl-groups, $n$ stands for one of the numbers one and two and wherein the naphthalene nucleus may be further substituted. When the coupling is complete after several hours, the solution is rendered alkaline and the dyestuff is salted out, filtered and dried. For reducing the nitro group, the dyestuff is dissolved in water, then the necessary quantity of a suitable reducing agent is added, for example, sodium sulfide. The solution is heated, say to about 80–100° C. for ½–1 hour while thoroughly stirring, and the dyestuff is isolated in the usual manner.

In the form of their alkali metal salts our new dyestuffs are metallic lustrous powders, soluble in water and dyeing wool bluish-red to bluish-green even shades of excellent fastness to fulling and light. On reduction with stannous chloride and hydrochloric acid they yield a diamino-diarylsulfone of the general formula:

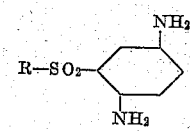

wherein R stands for a benzene nucleus and wherein R and the benzene nucleus may be further substituted, and an aminonaphthalene-sulfonic acid of the general formula:

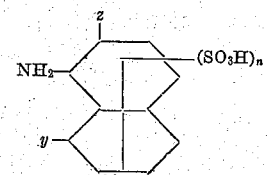

wherein $y$ stands for hydrogen or a hydroxy group, $z$ stands for an amino-group which may be substituted by alkyl-, or aryl-groups, $n$ stands for one of the numbers one and two and wherein the naphthalene nucleus may be further substituted.

The following examples will illustrate our invention, without limiting it thereto:

*Example 1.*—380 parts by weight of the sodium salt of 5-nitro-2-amino-1.1'-diphenyl-sulfone-3'-sulfonic acid are diazotized indirectly by dissolving the base in water with the addition of an alkali, adding to the solution the calculated amount of sodium nitrite and acidifying with hydrochloric acid. The diazotization proceeds slowly and is complete after about 2-3 hours. The aqueous suspension of the diazo-compound is then slowly introduced into a Congo-acid aqueous suspension of 236 parts by weight of 2-methylamino-naphthalene-7-sulfonic acid. When the coupling is complete after several hours, the solution is rendered alkaline, the dyestuff is salted out with common salt, filtered and dried. The dyestuff thus obtained dyes wool reddish-blue even shades of excellent fastness to fulling and light.

The analogous dyestuffs from 5-nitro-2-amino-4'-methyl-1.1'-diphenylsulfone-3'-sulfonic acid and from 5-nitro-2-amino-4'-methoxy-1.1'-diphenylsulfone-3'-sulfonic acid dye wool similar shades of the same fastness properties.

If 2-amino-naphthalene-7-sulfonic acid is used as coupling component instead of 2-methyl-amino-naphthalene-7-sulfonic acid, dyestuffs are obtained dyeing wool reddish-violet shades of good fastness properties.

*Example 2.*—358 parts by weight of 5-nitro-2-amino-1.1'-diphenylsulofne-3'-sulfonic acid are diazotized indirectly as indicated in Example 1. When the diazotization is complete after several hours, the diazo-solution is introduced into an aqueous suspension rendered acid to Congo of 239 parts by weight of 2-amino-8-hydroxynaphthalene-6-sulfonic acid. When the coupling is complete after several hours, the dyestuff is isolated in the usual manner. It has in the free state the following formula:

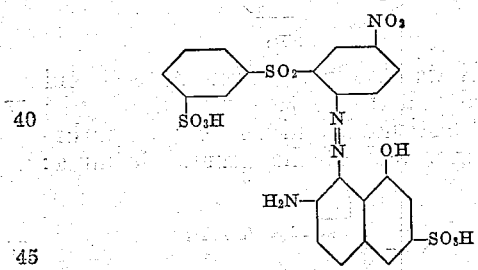

and dyes wool clear even greenish-blue shades which are especially beautiful in artificial light, and which are fast to light.

If the 2-amino-8-hydroxy-naphthalene-6-sulfonic acid is substituted by the 2-methyl-amino-8-hydroxy-naphthalene-6-sulfonic acid, a dyestuff is obtained dyeing wool a greenish to bluish grey of the same properties.

*Example 3.*—650 parts by weight of the dyestuff prepared according to example 1 from diazotized 5-nitro-2-amino-1.1'-diphenylsulfone-3'-sulfonic acid and 2-methylamino-naphthalene-7-sulfonic acid, are dissolved in water and reduced with 357 parts by weight of sodium sulfide at 90-100° C. while thoroughly stirring. When the reduction is complete after ½-¾ hours, the dyestuff is isolated in the usual manner. It dyes wool clear even reddish-bordeau shades of excellent fastness to fulling and light.

*Example 4.*—292 parts by weight of 5-nitro-2-amino-4'-methyl-1.1'-diphenylsulfone are dissolved in concentrated sulfuric acid and are diazotized in the usual manner with a solution of 69 parts by weight of sodium nitrite in concentrated surfuric acid. The diazo-solution is slowly introduced while thoroughly stirring into an aqueous suspension of 239 parts by weight of 2-amino-8-hydroxy-naphthalene-6-sulfonic acid, care being taken that the temperature does not exceed +5° C. When the coupling is complete, the acid group of the dyestuff is transformed into its sodium salt in the usual manner and the sodium salt is isolated by salting out. The dyestuff is more difficultly soluble than that of Example 2 and otherwise has the same properties.

We claim:

1. As new products monoazodyestuffs of the general formula:

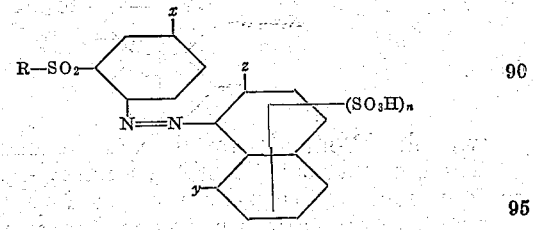

wherein R stands for a benzene nucleus which may be substituted by a substituent of the group consisting of the alkyl-, a sulfonic acid-, hydroxy- and substituted hydroxy group, $x$ stands for a substituent of the group consisting of the nitro- and $NH_2$-group, $y$ stands for a substituent of the group consisting of hydrogen and the hydroxyl-group, $z$ stands for an amino group which may be substituted by alkyl-groups, $n$ stands for one of the numbers one and two, being in the form of their alkali-metal salts metallic lustrous powders, soluble in water, and dyeing wool bluish-red to bluish-green even shades of excellent, fastness to fulling and light.

2. As new products monoazodyestuffs of the general formula:

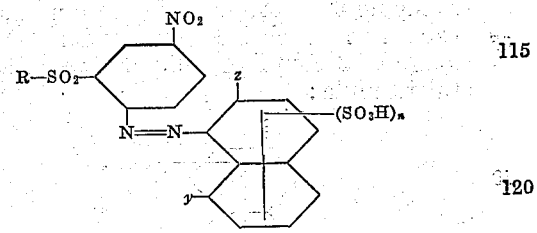

wherein R stands for a benzene nucleus which may be substituted by a substituent of the group consisting of the alkyl, sulfonic acid-, hydroxy- and substituted hydroxy group, $y$ stands for a substituent of the group consisting of hydrogen and the hydroxyl group, $z$ stands for an amino group which may be substituted by alkyl-groups, $n$ stands for one of the numbers one and two, being in the form of their alkali-metal salts metallic lustrous powders, soluble in water, and dyeing wool bluish-red to bluish-green even shades of excellent fastness to fulling and light.

3. As new products monoazodyestuffs of the general formula:

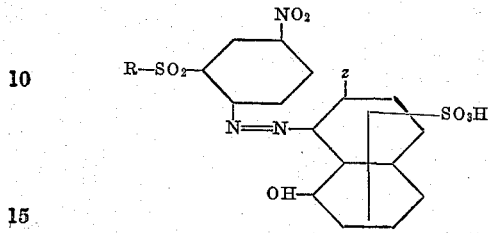

wherein R stands for a benzene nucleus which may be substituted by a substituent of the group consisting of the alkyl-, sulfonic acid-, hydroxy- and substituted hydroxy group and $z$ stands for an amino group which may be substituted by alkyl-groups, being in the form of their alkali-metal salts metallic-lustrous powders, soluble in water, and dyeing wool bluish-red to bluish-green even shades of excellent fastness to fulling and light.

4. As a new product the monoazodyestuff of the formula:

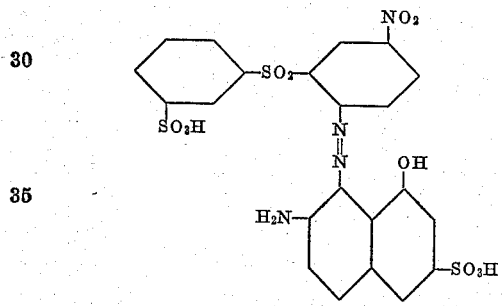

being in the form of its alkali metal salts a dark metallic lustrous powder, dyeing wool clear even greenish-blue shades of excellent fastness to fulling and light.

In testimony whereof we have hereunto set out hands.

WINFRID HENTRICH. [L. S.]
RUDOLF KNOCHE. [L. S.]